United States Patent
Cheng et al.

(10) Patent No.: US 12,441,923 B2
(45) Date of Patent: Oct. 14, 2025

(54) BRANCHED POLYSILOXANES AND METHODS FOR THEIR PREPARATION AND USE AS HEAT TRANSFER FLUIDS

(71) Applicants: Dow Silicones Corporation, Midland, MI (US); Dow Global Technologies LLC, Midland, MI (US)

(72) Inventors: Yang Cheng, Midland, MI (US); Xiaoyuan Zhou, Midland, MI (US); Eric Joffre, Midland, MI (US); Mike Ferritto, Midland, MI (US); Nanguo Liu, Midland, MI (US); Christoph Lang, Schindellegi (CH); John Cuthbert, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 666 days.

(21) Appl. No.: 17/755,240

(22) PCT Filed: Jan. 4, 2021

(86) PCT No.: PCT/US2021/012026
§ 371 (c)(1),
(2) Date: Apr. 25, 2022

(87) PCT Pub. No.: WO2021/141836
PCT Pub. Date: Jul. 15, 2021

(65) Prior Publication Data
US 2023/0002660 A1    Jan. 5, 2023

Related U.S. Application Data

(60) Provisional application No. 62/958,889, filed on Jan. 9, 2020.

(51) Int. Cl.
*C09K 5/10* (2006.01)

(52) U.S. Cl.
CPC ..................... *C09K 5/10* (2013.01)

(58) Field of Classification Search
CPC ............. C09K 5/10; H01B 3/46; H01B 3/465
USPC ................................................ 252/78.3, 573
See application file for complete search history.

(56) References Cited

U.S. PATENT DOCUMENTS

| | | |
|---|---|---|
| 2,598,435 A | 5/1952 | Mohler et al. |
| 2,681,355 A | 6/1954 | Barry et al. |
| 4,048,084 A * | 9/1977 | Knollmueller ........ C07F 7/0896 252/78.3 |
| 4,122,109 A | 10/1978 | Halm |
| 4,193,885 A | 3/1980 | Halm |
| 4,560,784 A | 12/1985 | Mori et al. |
| 4,840,743 A | 6/1989 | Gardiner |
| 4,898,956 A | 2/1990 | Hilty |
| 8,852,545 B2 | 10/2014 | Brinson et al. |
| 9,862,869 B2 * | 1/2018 | Hoffmann ................ C09K 5/10 |
| 10,351,747 B2 * | 7/2019 | Doerrich ............... C07F 7/0838 |
| 2011/0268641 A1 | 11/2011 | Brinson et al. |
| 2012/0046485 A1 * | 2/2012 | Wrobel ................... E06B 3/968 165/185 |
| 2018/0010027 A1 | 1/2018 | Doerrich et al. |

FOREIGN PATENT DOCUMENTS

| | | | | |
|---|---|---|---|---|
| EP | 641849 A2 * | 3/1995 | ............... | C09K 5/10 |
| RU | 2221826 C1 * | 1/2004 | | |
| WO | WO-2019242858 A1 * | 12/2019 | | |

OTHER PUBLICATIONS

Thompson et al. ("Rapid assembly of complex 3D siloxane architectures", J. Am. Chem. Soc., 2008, 130, 32-33) (Year: 2008).*
Heidsieck et al. ("Branched siloxanes as possible new heat transfer fluids for application in parabolic through solar thermal power plants", Solar Energy Materials and Solar Cells, Elsevier Science Publishers, Amsterdam, NL, vol. 161, Dec. 9, 2016, pp. 278-284) (Year: 2016).*
Boldyrev et al. ("New approach to the synthesis of polymethylsilsesquioxane dendrimers", Polymer, 174, 2019, 159-169) (Year: 2019).*
Chojnowski, Ring-Opening Polymerizagion of Octamethyltetrasila-1,4-dioxane, 2D2 2. Cyclic Oligomer Formaion and Mechanism of the Reaction, Macromolecules. 1994, vol. 27, pp. 2302-2309.
Chojnowski, "Selective Anionic Ring-Opening Polymerization of Permethyltetrasila-1, 4-dixoane, 2D2. Transformation of Poly(silaether) in Polysiloxane and Polysilyene." Macromolecules. 1995, pp. 2996-2999.
Chojnowski, J., et al. Thermal Decomposition of Poly(tetramethyloxydisilaethylene), Journal of Inorganic and Organometallic Polymers, vol. 2, No. 4, 1992, pp. 387-404.
Chojnowski., "Equilibria and kinetics of the cationic ring-opening polymerization of permethylated 1,4-dioxa-2,3,5,6-tetrasilacyclohexane." Makromol. Chem. 1993, vol. 194, pp. 3271-3286.
Cypryk, "Teriary Trisilyloxonium ion in cationic ring-opening polymerization of a model cyclic siloxane, octamethyl-1,4-dioxatetrasilacyclohexane", J. Organometallic Chemistry 686, 2003, pp. 373-378.
Krempner, "Polysilane Dendrimers", Polymers 2012, vol. 4, pp. 408-447.
Kumada, "Preparation of Some Linear, Cyclic and Cage-Like Methylsilicon Polymers with a Frame-work of -Si—Si—O-", Journal of the Chemical Society of Japan, Industrial Chemistry Section, 1963 vol. 66, No. 5, pp. 637-641, Note: Only abstract submitted. Only abstract considered.

(Continued)

*Primary Examiner* — Matthew R Diaz
(74) *Attorney, Agent, or Firm* — Catherine U. Brown

(57) ABSTRACT

A branched polysiloxane compound and methods for its preparation are disclosed. The branched polysiloxane compound may be used as a heat transfer fluid.

9 Claims, No Drawings

(56) References Cited

OTHER PUBLICATIONS

Lipp, "Measurement of Trace Silanol in in Siloxanes by IR Spectroscopy", Applied Spectroscopy, 1991, vol. 45, No. 3, pp. 477-483.
Thomas, "Thermal Analysis of Polydimethylsiloxanes. I. Thermal Degradation in Controlled Atmospheres", Journal of Polymer Science Part A-2, 1969, vol. 7, pp. 537-549.
Heidsieck et al. "Branched siloxanes as possible new heat transfer fluids for application in parabolic through solar thermal power plants", Solar Energy Materials and Solar Cells, Elsevier Science Publishers, Amsterdam, NL, vol. 161, Dec. 9, 2016, pp. 278-284.

* cited by examiner

BRANCHED POLYSILOXANES AND METHODS FOR THEIR PREPARATION AND USE AS HEAT TRANSFER FLUIDS

CROSS REFERENCE TO RELATED APPLICATIONS

This application is a U.S. national stage filing under 35 U.S.C. § 371 of PCT Application No. PCT/US21/012026 filed on 4 Jan. 2021, currently pending, which claims the benefit of U.S. Provisional Patent Application No. 62/958,889 filed 9 Jan. 2020 under 35 U.S.C. § 119(e). PCT Application No. PCT/US21/012026 and U.S. Provisional Patent Application No. 62/958,889 are each hereby incorporated by reference.

TECHNICAL FIELD

A branched polysiloxane compound is useful as a heat transfer fluid (HTF).

BACKGROUND

The Concentrated Solar Power (CSP) industry needs heat transfer fluids (HTFs) that can be used at high temperature for prolonged periods. CSP plants use mirrors or lenses to concentrate solar energy from a large area of sunlight onto a receiver. A heat transfer fluid can be heated in the receiver and circulated to transport thermal energy and produce steam in a turbine, which can power a generator to produce electricity. CSP plants may employ linear Fresnel reflector (LFR) systems, power tower systems, dish engine systems, and/or parabolic trough systems to concentrate solar energy onto the receiver.

LFR employs long parallel rows of flat mirrors instead of curved mirrors. These focus solar energy onto elevated receivers (located above the mirrors), which have a system of tubes through which an HTF flows.

Power tower systems use a central receiver system. Computer-controlled mirrors (called heliostats) track the sun and focus solar energy on a receiver at the top of a tower. The focused energy is used to heat an HTF in the receiver. The heated HTF can be used to produce steam and run a central power generator.

In dish engine systems, mirrors are distributed over a parabolic dish surface to concentrate sunlight on a receiver fixed at the focal point. The receiver contains an HTF that is heated in the receiver. The system uses the heated HTF to generate mechanical power that runs a generator or alternator to produce electricity.

Parabolic trough systems use curved mirrors to focus sunlight onto a receiver tube that runs through a trough. In the receiver tube, a heat transfer fluid can absorb the solar energy and pass through a heat exchanger to heat water and produce steam. The steam can drive a steam turbine to generate electricity. HTFs based on an eutectic mixture of 73.5% diphenyl oxide (DPO) and 26.5% biphenyl (BP) such as DOWTHERM™ A (DTA) Heat Transfer Fluid have been commonly used in CSP plants with parabolic trough (PT) collector technology since the 1980's. In these CSP plants the HTF absorbs heat from the sun at PT collectors and transfers it to the power block where steam is generated and expanded in turbines that drive generators to produce electricity.

One way to reduce the cost of CSP is increasing the operating temperature of the HTF. The current DPO/BP HTF used in most of the 60 PT CSP plants is operated at temperatures between 293° C. (560° F.) and 393° C. (740° F.). This allows the steam Rankine cycle to operate at 383° C. (721° F.) that limits the efficiency of the water steam Rankine cycle to 38.4%. An increase of the maximum HTF temperature to 530° C. (986° F.) for example could increase the superheated steam temperature of the Rankine cycle to 520° C. (968° F.) allowing a cycle efficiency of 42.7%.

The higher efficiency of the Rankine cycle would allow a reduction of the solar field size that would allow savings in capital cost and maintenance. CSP plants with thermal storage also benefit from higher operating temperatures as the storage size can be reduced which results in cost savings for capital, operating cost.

The maximum operating temperature of 393° C. (739° F.) of PT CSP plants is set by HTF suppliers' restriction of the maximum operating temperature of DPO/BP HTF to 400° C. (750° F.) due to accelerated thermal aging above that temperature.

The CSP industry needs HTFs with higher thermal stability than DOWTHERM™ A Heat Transfer Fluid, but also with a freeze point at ambient temperatures or below, low vapor pressure and excellent heat transfer properties. SYLTHERM™ 800 Heat Transfer Fluid has been widely used for cooling and heating applications up to 400° C. This product is a linear polydimethylsiloxane (PDMS) with a viscosity of 10 mPa·s (measured at 20° C.). However, it has not been selected for commercial CSP plants due to higher cost compared to DPO/BP based HTF. If linear PDMS such as SYLTHERM™ 800 Heat Transfer Fluid is heated at high temperatures for extended periods of time, vapor pressure may increase and/or viscosity may decrease.

SUMMARY

A branched polysiloxane compound may be used as a heat transfer fluid. A method of operating a system at a temperature up to 500° C. comprises using a heat transfer fluid comprising the branched polysiloxane compound.

DETAILED DESCRIPTION

The branched polysiloxane compound comprises a moiety of formula: $(TM_2)_x$, where T represents a unit of formula $(RSiO_{3/2})$ and M represents a unit of formula $(R_3SiO_{1/2})$, each R is an independently selected monovalent hydrocarbon group of 1 to 6 carbon atoms, and subscript x≥3. Suitable monovalent hydrocarbon groups for R include alkyl, alkenyl, and aryl groups. For example, the alkyl group may be methyl, ethyl, propyl (including n-propyl and/or iso-propyl), and butyl (including n-butyl, t-butyl, sec-butyl and/or iso-butyl). The alkenyl group may be vinyl, allyl, or hexenyl. The aryl group may be phenyl. Alternatively, each R may be methyl, vinyl or phenyl; alternatively methyl. $TM_2$ has formula:

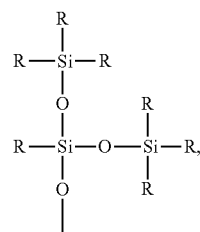

where R is as described above.

Examples of branched polysiloxane compounds having the moiety of formula $(TM_2)_x$, described above, include species having unit formulae selected from the group consisting of: (i) $T(TM_2)_3$, (ii) $Q(TM_2)_4$, and (iii) $T_m(TM_2)_n$, where T and M are as described above, in formula (ii) Q has formula $(SiO_{4/2})$, and in formula (iii) subscripts m and n represents molar amounts of T units and $(TM_2)$ moieties, respectively, subscript m>1, subscript n>3, and n/m is 1 to 1.5.

TABLE 1

Branched Polysiloxane Compounds (representative species)

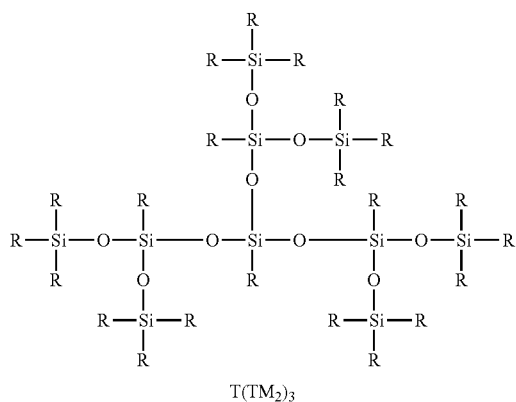

$T(TM_2)_3$

When each R is a methyl group, this compound will have Empirical Formula: $C_{22}H_{66}O_9Si_{10}$ with molecular weight 755.61.

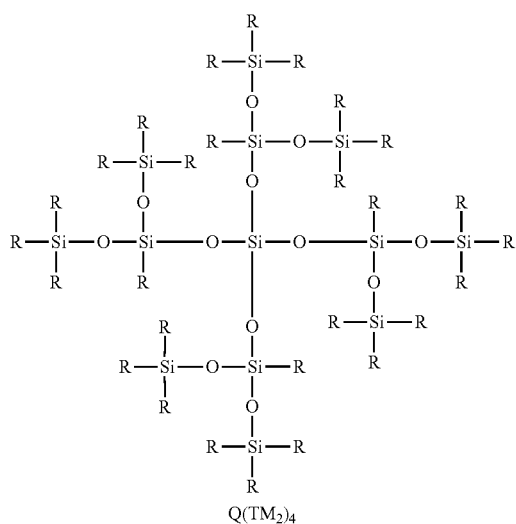

$Q(TM_2)_4$

When each R is a methyl group, this compound will have Empirical Formula: $C_{28}H_{84}O_{12}Si_{13}$ with molecular weight 978.07

Branched polysiloxane compounds as described above may be prepared by a method comprising:
1) combining starting materials comprising:
    A) an organohydridosiloxane oligomer of formula

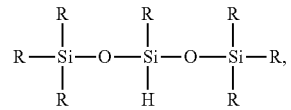

where R is as described above;
    B) an alkoxy-functional organosilicon compound; and
    C) a boron containing Lewis Acid catalyst.

In the method above, starting material A) may be charged into a reactor. The reactor may have an inert gas blanket or other means for maintaining an inert atmosphere inside the reactor. All or a portion of starting material C) may be combined with starting material A) in the reactor. A catalyzed mixture comprising starting material B) and all or a portion of starting material C) may be added to the reactor. The reactor may be cooled (e.g., with a jacket or other cooling apparatus). The method may be performed at a temperature 50° C., alternatively 30° C., alternatively 0° C. to 50° C., alternatively 0° C. to 30° C., alternatively RT to 30° C.

The method described above may optionally further comprise one or more additional steps. The method may optionally further comprise: recovering the branched polysiloxane compound. Recovering may be performed by any convenient means such as stripping or distillation, optionally under reduced pressure.

In the method described above, e.g., in step 1), starting material A) and starting material B) may be added in amounts such that there is a molar excess of starting material A) compared to moles of —OR on starting material B). The exact amount depends on various factors including the amount of water present, however, the amounts of A) and B) may be such that sufficient starting material A) is provided to provide at least 3 mol %, alternatively at least 5 mol %, alternatively at least 10 mol %, excess for every mole of —OR in starting material B).

The branched polysiloxane compounds may be prepared according to the method disclosed in U.S. Patent Application 62/699,192 by varying appropriate starting materials. Starting materials that may be used in the method described above include A) the organohydridosiloxane oligomer, B) the alkoxy-functional organosilicon compound, and C) the catalyst, and these starting materials are further described below.

A) Organohydridosiloxane Oligomer

The organohydridosiloxane oligomer used in the method described above has formula

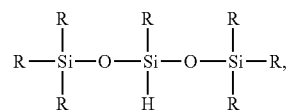

where R is as described above. Examples of suitable organohydridosiloxane oligomers include 1,1,1,3,5,5,5-heptamethyltrisiloxane. Suitable organohydridosiloxane oligomers are commercially available, e.g., from Dow Silicones Corporation of Midland, Michigan, USA.

B) Alkoxy-Functional Organosilicon Compound

The alkoxy-functional organosilicon compound used in the method described above may have formula B-1)

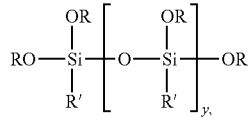

where R is as described above, each R' is independently selected from the group consisting of R and OR, and subscript y 0, alternatively y may be 0 to 12, alternatively 0 to 5, and alternatively 1 to 12. Examples of suitable alkoxy-functional organosilicon compounds are commercially available, e.g., from Dow Silicones Corporation. For example, when y=0 formula B-1) is an alkoxysilane. When y≥0 and R' is R, starting material B) may be methyltrimethoxysilane, methyltriethoxysilane, ethyltriethoxysilane, or ethyltrimethoxysilane. Alternatively, when y=0 and R' is OR, starting material B) may be tetraethoxysilane or tetramethoxysilane.

Alternatively, the alkoxy-functional organosilicon compound may have unit formula B-2): $[RSi(OR'')_2O_{1/2}]_a[RSi(OR'')O_{2/2}]_b[RSiO_{3/2}]_c+[RSi(OR'')_3]_d$, where R is as described above; each R'' is independently selected from the group consisting of H and an alkyl group of 1 to 6 carbon atoms; and subscripts a, b, and c represent mole fractions of each unit in brackets with the proviso that a quantity (a+b+c)=1. Subscript a may be 0.2 to 0.35, alternatively 0.24 to 0.29. Subscript b may be 0.45 to 0.60, alternatively 0.49 to 0.56. Subscript c may be 0.1 to 0.3, alternatively 0.14 to 0.24. Subscript d may be 0.5 to 1. Alternatively, in formula B-2), each R can be independently selected from the group consisting of alkyl, alkenyl and aryl; alternatively methyl, vinyl, and phenyl. Alternatively, in formula B-2), each R can be independently selected from the group consisting of alkyl and aryl; alternatively methyl and phenyl. Alternatively, in formula B-2), each R may be alkyl, alternatively methyl. The alkoxy-functional organosilicon compound of formula B-2) may have a weight average molecular weight (Mw) of 300 g/mol to 1,200 g/mol, alternatively 325 g/mol to 400 g/mol, alternatively 350 g/mol to 400 g/mol. The alkoxy-functional organosilicon compound of formula B-2) may have a number average molecular weight (Mn) of at least 200 g/mol, alternatively 200 g/mol to 500 g/mol, alternatively 250 g/mol to 500 g/mol, alternatively 250 g/mol to 400 g/mol, alternatively 300 g/mol to 350 g/mol; alternatively 300 g/mol to 400 g/mol; and alternatively 310 g/mol to 350 g/mol. Mw and Mn are measured by GPC. Suitable alkoxy-functional organosilicon compounds of formula B-2) are known in the art and are commercially available, such as may be DOWSIL™ CF-2403 Resin from Dow Silicones Corporation of Midland, Michigan, USA.

Alternatively, the alkoxy-functional organosilicon compound may comprise B-3) a silsesquioxane resin, i.e., a resin comprising T units of formula $(R''SiO_{3/2})$, where R'' is as described above. Silsesquioxane resins suitable for use herein are known in the art and are commercially available. For example, a methylmethoxysiloxane methylsilsesquioxane resin having a DP of 15 and a weight average molecular weight (Mw) of 300 g/mol to 400 g/mol is commercially available as DOWSIL™ US-CF 2403 Resin from Dow Silicones Corporation. Alternatively, the silsesquioxane resin may have phenylsilsesquioxane units, methylsilsesquioxane units, or a combination thereof. Alternatively, the silsesquioxane resin may further comprise D units of formulae $(R_2SiO_{2/2})$ and/or $(R''SiO_{2/2})$ and T units of formulae $(RSiO_{3/2})$ and/or $(R''SiO_{3/2})$, i.e., a DT resin, where R and R'' are as described above, provided at least some instances of R'' are OR. DT resins are known in the art and are commercially available, for example, methoxy functional DT resins include DOWSIL™ 3074 and DOWSIL™ 3037 resins.

C) Catalyst

Starting material C) is a boron containing Lewis Acid. Alternatively, the boron containing Lewis Acid may be a trivalent boron compound with at least one perfluoroaryl group, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10, and alternatively 6 carbon atoms. For example, the Lewis Acid catalyst may be selected from $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B$—$CH_2CH_2Si(CH_3)$. Alternatively, starting material C) may be a Piers-Rubinsztajn reaction catalyst of formula $B(C_6F_5)_3$, tris(pentafluorophenyl)borane. Such boron containing Lewis acids are commercially available from, e.g., Millipore Sigma of St. Louis, Missouri, USA. The amount of starting material C) will depend on the type and amount of other starting materials used, however, starting material A) may be present in an amount of 50 ppm to 6000 ppm based on combined weights of starting materials A), B) and C). Alternatively, the amount may be 50 ppm to 600 ppm on the same basis. Alternatively, a first portion of starting material C) may be added to starting material A) in an amount of 25 ppm to 100 ppm based on weight of starting material A), and a second portion of starting material C) may be added to starting material B) in an amount of 100 ppm to 300 ppm before combining the starting materials in step 1), as described above.

D) Organic Solvent

A solvent may optionally be used in the method. The solvent may facilitate introduction of certain starting materials, such as starting material C) the boron containing Lewis acid. Solvents used herein are those that help fluidize the starting materials but essentially do not react with any of these starting materials. Solvent may be selected based on solubility the starting materials and volatility of the solvent. The solubility refers to the solvent being sufficient to dissolve and/or disperse the starting materials. Volatility refers to vapor pressure of the solvent.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride.

The amount of solvent can depend on various factors including the type of solvent selected and the amount and type of other starting materials selected. However, the amount of solvent may range from 0.1% to 99%, alternatively 2% to 50%, based on combined weights of starting materials A), B), and C).

Starting Material E) Neutralizing Agent

Starting material E) is neutralizing agent that may optionally be used to neutralize starting material C) after the product forms. Alumina, triphenyl amine, triphenyl phosphine, and phenylacetylene are suitable neutralizing agents. Neutralizing agents are known in the art and are commercially available, e.g., from Millipore Sigma of St. Louis, Missouri, USA. The amount of neutralizing agent depends on various factors including the amount of starting material A), however, starting material E) may be present in an amount sufficient to provide a weight ratio of neutralizing agent to boron containing Lewis acid (E:A ratio) of 1:1 to 1000:1. Alternatively, the neutralizing agent may be alumina. When the neutralizing agent is triphenyl phosphine or phenylacetylene, the E:A ratio may be 1:1 to 20:1. Alternatively, when the neutralizing agent is alumina, the E:A ratio may be 100:1 to 1000:1. Without wishing to be bound by theory, it is thought that the neutralizing agent will form a complex with the catalyst. The complex may optionally be removed after the branched polysiloxane compound is prepared as described above in step 1).

Method of Use

The branched polysiloxane compounds prepared as described above may be used as heat transfer fluids. For example, the branched polysiloxane compounds may be used in a method of operating a system at an operating temperature of 300° C. to 500° C., such as those disclosed in U.S. Patent Publication 2018/0010027, instead of the branched polydiorganosiloxane described therein.

For example, the branched polysiloxane compounds described herein may be used as heat transfer fluids in various heating applications such as the chemical or pharmaceutical processing, oil and gas processing, waste heat recovery, food and beverage manufacturing and equipment and product temperature control. The branched polysiloxane compounds may be used as heat transfer fluids for heating or cooling. The branched polysiloxane compounds may be used as heat transfer fluids at 25° C. to 500° C., alternatively >25° C. to 500° C., alternatively 300° C. to 450° C., alternatively 300° C. to 425° C., alternatively 350° C. to 450° C., alternatively 350° C. to 400° C., and alternatively 300° C. to 500° C.

Alternatively, the branched polysiloxane compounds described herein may be employed as high temperature heat transfer media in solar thermal devices. Alternatively, the branched polysiloxane compounds described herein may be used as heat transfer fluids in concentrated solar power plants.

A method for operating a CSP plant comprises: 1) concentrating solar energy on a receiver, 2) heating a heat transfer fluid in the receiver, where the heat transfer fluid comprises the branched polysiloxane compound (as described above), and 3) circulating the heat transfer fluid and generating electricity using the heat transfer fluid after heating in step 2). The CSP plant may comprise a system selected from the group consisting of a parabolic trough system, a LFR system, a power tower system, and/or a dish engine system.

Examples

These examples are intended to illustrate the invention to one skilled in the art and are not to be interpreted as limiting the scope of the invention set forth in the claims.

In this Reference Example 1, a branched polymethylsiloxane compound of unit formula $T(TM_2)_3$ was synthesized as follows.

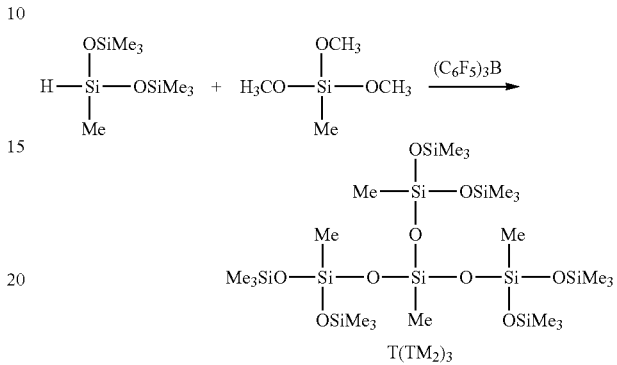

164.4 g of 1,1,1,3,5,5,5-heptamethyltrisiloxane (Bis-H) was charged to a 500 mL 4 neck flask equipped with a thermal couple, mechanical stirrer, and water-cooled condenser adapted to a $N_2$ bubbler. 50 ppm of tris(perfluorophenyl)borane (BCF) was added to the flask. 30 g of methyltrimethoxysilane and 150 ppm of BCF were mixed in an addition funnel to form a catalyzed mixture. The catalyzed mixture was slowly added into the flask within 35 minutes. An ice water bath was used to remove heat and control the temperature of the contents of the flask below 30° C. After 1.5 hours stirring at RT, $^1$H NMR indicated that the methoxy groups had been completely reacted. Volatiles were removed via rotary evaporator at 120° C. for 30 minutes and then at 150° C. for 60 minutes. The vacuum was <1 torr. The product was a clear colorless liquid.

In this Reference Example 2, a branched polymethylsiloxane compound of unit formula $T_m(TM_2)_n$, n/m of 1 was synthesized as follows. 132 g of 1,1,1,3,5,5,5-heptamethyltrisiloxane (Bis-H) was charged to a 500 mL 4 neck flask equipped with a thermal couple, mechanical stirrer, and water-cooled condenser adapted to a $N_2$ bubbler. 25 ppm of tris(perfluorophenyl)borane (BCF) was added to the flask. 40.5 g of DOWSIL™ CF-2403 Resin and 175 ppm of BCF were mixed in an addition funnel to form a catalyzed mixture. The catalyzed mixture was slowly added into the flask within 32 minutes. An ice water bath was used to remove heat and control the temperature of the contents of the flask below 30° C. After 1 hour stirring at RT, $^1$H NMR indicated that the methoxy groups in the DOWSIL™ CF-2403 Resin had been completely reacted. Volatiles were removed via rotary evaporator at 150° C. for 1.5 hours. The product was a clear colorless liquid.

In this Reference Example 3, a branched polymethylsiloxane compound of unit formula $Q(TM_2)_4$ was synthesized as follows.

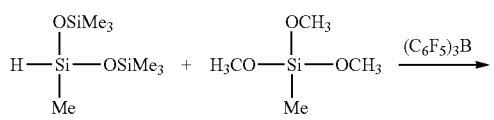

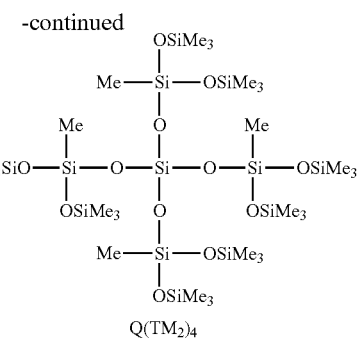

Q(TM$_2$)$_4$ 157.3 g of 1,1,1,3,5,5,5-heptamethyltrisiloxane (Bis-H) was charged to a 500 mL 4 neck flask equipped with a thermal couple, mechanical stirrer, and water-cooled condenser adapted to a N$_2$ bubbler. 25 ppm of tris(perfluorophenyl)borane (BCF) was added to the flask. 25.0 g of tetramethoxysilane (TMOS) and 175 ppm of BCF were mixed in an addition funnel to form a catalyzed mixture. The catalyzed mixture was slowly added into the flask within 40 minutes. An ice water bath was used to remove heat and control the temperature of the contents of the flask below 30° C. After 1 hours stirring at RT, $^1$H NMR indicated that Si—OMe residual content was 0.3%. Stirring continued for another 1.5 hours. Then 7.3 g of alumina was added to the flask and stirred for 2 hours at RT. After filtration through a 0.45 μm filter membrane, the volatiles were removed via rotary evaporator at 150° C. for 50 minutes. The product was a clear colorless soft gel having a melting point higher than 80° C.

In this Reference Example 4, a thermo-stability evaluation by Accelerating Rate calorimetry (ARC) test was conducted at 400° C. ARC Test Protocol: A 24 hour isothermal ARC test at 400° C. was performed to screen the thermal stability of the branched polymethylsiloxane compounds prepared as described in Reference Examples 1-3, above. Exothermic activity or excessive pressure generation at these conditions is an indication of insufficient thermal stability. Two linear PDMS materials and two branched polymethylsiloxanes were used for comparison. The first linear PDMS material was XIAMETER™ PMX-200 2 mPa·s fluid and the second was XIAMETER™ PMX-200 10 mPa·s fluid, both of which are commercially available from Dow Silicones Corporation of Midland, Michigan, USA. The first branched material was tetra(trimethylsiloxy)silane, abbreviated M$_4$Q, and was purchased from Millipore Sigma of St. Louis, Missouri, USA. The second branched material was tris(trimethylsiloxy)methylsilane, abbreviated M$_3$T, and was purchased from Gelest Inc. of Morrisville, Pennsylvania, USA. The compound of formula T(TM$_2$)$_3$ from Reference Example 1 and the compound of formula T$_m$(TM$_2$)$_n$ from Reference Example 2 were clear oils and used in the ARC test directly. The compound of formula Q(TM$_2$)$_4$ from Reference Example 3 was a soft gel and was dissolved in DOWTHERM™ A Heat Transfer Fluid and/or SYLTHERM™ 800 Heat Transfer Fluid before the ARC test (90% of Q(TM$_2$)$_4$ and 10% of DOWTHERM™ A Heat Transfer Fluid or SYLTHERM™ 800 Heat Transfer Fluid).

ARC Test Results: The branched polymethylsiloxane compounds prepared in Reference Examples 1-3 did not show any exothermic reaction in the ARC test, and the pressure increase was much smaller for each of these compounds than the pressure increase observed when testing the linear PDMS with viscosity of 2 mPa·s and the linear PDMS with viscosity of 10 mPa·s. In addition, alternative branched polymethylsiloxane compounds (of formulae M$_4$Q and M$_3$T) were also tested according to the ARC test described above and both exhibited an exotherm.

The branched polysiloxane compounds prepared as described in Reference Examples 1-3 exhibited smaller pressure build up (see Working Examples 5-8 in Table 2, below) than the compounds tested in Comparative Examples 1-4. Without wishing to be bound by theory, it is thought that lower pressure build up in heat transfer fluid systems and particularly in parabolic trough CSP plants is beneficial for the following reasons:

As CSP plants operate at temperatures of 400° C. and higher, the choice of construction material is limited as low cost construction materials such as standard carbon steel may not be able to stand combinations of high temperatures and high pressures. More robust construction materials can be used to design such systems, but at significantly higher cost. In addition to materials of construction, wall thickness of equipment must be increased for higher pressures and temperatures in such systems, and this can also increase cost significantly. Therefore, it is beneficial to select HTFs with lower vapor pressures that allow selection of a lower maximum allowable working pressure (MAWP) of the HTF system.

TABLE 2

ARC Test Conditions and Results

| Example | HTF | Time (min) | Temp (C.) | Pressure (psia) | Comments |
|---|---|---|---|---|---|
| Comparative Example 1 | M$_4$Q | 250 | 400 | 423 | SHR of 0.3° C./min during wait time |
|  |  | 260 | 405 | 435 | Exotherm detected |
|  |  | 371 | 450 | 657 | End of test |
|  |  |  |  |  | Cooldown P: 19 psia |
| Comparative Example 2 | M$_3$T | 555 | 400 | 796 | None |
|  |  | 1992 | 402 | 872 | End of test period of 1 day |
|  |  | 2253 | 450 | 1236 | End of test |
|  |  |  |  |  | Cooldown P: 20.5 psia |
| Comparative Example 3 | 2 mPa·s PDMS | 275 | 400 | 545 | None |
|  |  | 1715 | 400 | 535 | End of test period of 1 day |
|  |  | 1910 | 450 | 848 | End of test |
|  |  |  |  |  | Cooldown P: 15.8 psia |

TABLE 2-continued

ARC Test Conditions and Results

| Example | HTF | Time (min) | Temp (C.) | Pressure (psia) | Comments |
|---|---|---|---|---|---|
| Comparative Example 4 | 10 mPa·s PDMS | 290 | 400 | 91 | None |
| | | 1730 | 400 | 216 | End of search period of 1 day |
| | | 1928 | 450 | 711 | End of test Cooldown P: 18 psia |
| Working Example 5 | Ref Ex 3 Q(TM2)4 (with DOWTHERM ™ Heat Transfer Fluid) | 230 | 400 | 101 | None |
| | | 1675 | 400 | 157 | End of search period of 1 day |
| | | 1860 | 450 | 219 | End of test Cooldown P: 14 psia |
| Working Example 6 | Ref Ex 3 Q(TM2)4 (with SYLTHERM ™ 800 Heat Transfer Fluid) | 255 | 400 | 44 | none |
| | | 1680 | 400 | 67 | End of search period of 1 day |
| | | 1862 | 450 | 93 | End of test Cooldown P: 13 psia |
| Working Example 7 | Ref Ex 1 T(TM$_2$)$_3$ | 270 | 400 | 68 | None |
| | | 1840 | 400 | 122 | End of search period of 1 day |
| | | 2040 | 450 | 299 | End of test Cooldown P: 17 psia |
| Working Example 8 | Ref Ex 2 T$_m$(TM$_2$)$_n$ | 262 | 400 | 46 | None |
| | | 1829 | 400 | 98 | End of search period of 1 day |
| | | 2010 | 450 | 130 | End of test Cooldown P: 60 psia |

The ARC test showed that Working Examples 5, 6, 7, and 8 were thermally stable at 400° C. for at least 1 day under the conditions tested. Comparative Example 1 showed an exothermic behavior and pressure increase during the test, indicating the sample was not thermally stable at 400° C. under the conditions tested.

The linear PDMS (10 mPa·s) of Comparative Example 4 was analyzed by GCMS before and after aging at 400° C. for 24 hours. After aging, the molecular weight distribution of the sample was completely changed and moved towards the low molecular weight range as compared to the un-aged sample, and D4 was detected as a major component after aging. Cyclic polydimethylsiloxanes such as D4, D5, and D6 may be undesirable.

The M$_4$Q material of Comparative Example 1 was also analyzed by GCMS before and after aging at 400° C. for 24 hours. Significant low molecular weight species (such as hexamethyldisiloxane) were detected, indicating the material was thermally unstable under the conditions tested.

The 2 mPa·s linear PDMS was analyzed by GCMS before and after aging at 400° C. for 24 hours. After aging, the molecular weight distribution of the sample was completely changed and significant amount of low molecular weight linear and cyclic compounds as well as high molecular weight species were detected.

The M$_3$T was analyzed by GCMS before and after aging at 400° C. for 24 hours. After aging, the GCMS showed that majority of M$_3$T degraded to hexamethyldisiloxane and two high molecular weight species.

The branched polysiloxane compounds of Reference Examples 1 and 2 (Working Examples 7 and 8) were also analyzed by GCMS before and after aging at 400° C. for 24 hours. These compounds exhibited improved thermal stability. The composition of each aged sample was essentially the same as the composition before aging at 400° C. for 24 hours.

The samples of Working Examples 5 and 6 were analyzed by LCMS before and after aging at 400° C. for 24 hours. These compounds exhibited improved thermal stability. The composition of each sample was essentially the same as the composition before aging at 400° C. for 24 hours.

In this Example 5, samples were aged at 400° C. for 3 days. Viscosity and weight of each sample were measured before and after aging. In an argon inert glove box, the samples (2.5-3.5 g each) were charged into a titanium sphere sample container with ¼" neck and then capped with Swage lock fitting. The oven test was carried out at 400° C. for three days. Q(TM$_2$)$_4$ was dissolved in T(TM$_2$)$_3$ to form a blend for this oven test, because T(TM$_2$)$_3$ showed better stability than SYLTHERM™ 800 Heat Transfer Fluid which is a linear PDMS containing a zirconium compound as a heat stabilizer. The aged materials were discharged from sphere container. The material recovery was good, and the viscosity of 400° C. aged material was not changed significantly (Table 3). The results are shown below in Table 3.

TABLE 3

Weight Loss and Viscosity Change After Aging at 400° C. for 3 Days

| Example | Sample Tested | Wt. before Aging | Wt. after Aging | Viscosity before Aging | Viscosity after Aging |
|---|---|---|---|---|---|
| Comparative Example 9 | 10 mPa·s PDMS PMX-200 | 2.52 | 2.41 | 11.6 | 8.4 |
| Comparative Example 10 | SYLTHERM ™ 800 Heat Transfer Fluid | 2.78 | 2.69 | 12.7 | 10.9 |
| Working Example 11 | T(TM$_2$)$_3$ of Ref Ex 1 | 2.86 | 2.77 | 8.1 | 9.9 |

TABLE 3-continued

Weight Loss and Viscosity Change After Aging at 400° C. for 3 Days

| Example | Sample Tested | Wt. before Aging | Wt. after Aging | Viscosity before Aging | Viscosity after Aging |
|---|---|---|---|---|---|
| Working Example 12 | $T_m(TM_2)_n$ of Ref Ex 2 | 3.11 | 2.85 | 71.9 | 50.2 |
| Working Example 14 | Blend* | 2.77 | 2.64 | Not tested | 27.3 |

*The blend contained 9 weight parts of $Q(TM_2)_4$ of Ref Ex 3 and 1 weight part of $T(TM_2)_3$ of Ref Ex 1.

The three days 400° C. aged samples were analyzed for composition by GC-MS and LC-MS. The studies on aged $T(TM_2)_3$ of Working Example 11 by GC-MS and LC-MS showed that $T(TM_2)_3$ was identified as the major component in the aged sample, along with small amount of small molecules, such as hexamethyldisiloxane (MM) and $M_3T$. The identification of $T(TM_2)_3$ as the major component in the aged sample further indicated this sample had good thermal stability and would be useful as a HTF in the CSP industry. The LC-MS studies on the aged sample of Working Example 12 showed no significant low molecular weight degraded species, further indicating this sample had good thermal stability and would be useful as a HTF in the CSP industry. The GC-MS and LC-MS studies on the aged Blend of Working Example 15 showed that $Q(TM_2)_4$ was observed as the major component, further indicating this sample had good thermal stability and would be useful as a HTF in the CSP industry.

In this Example 6, samples were aged as above in Example 5, except at 425° C. for 3 days. Weights, viscosities, and compositions were analyzed before and after aging as described above for Example 5.

TABLE 4

Weight Loss and Viscosity Change After Aging at 425° C. for 3 Days

| Example | Sample Tested | Wt. before Aging | Wt. after Aging | Viscosity before Aging | Viscosity after Aging |
|---|---|---|---|---|---|
| Working Example 15 | $T(TM_2)_3$ of Ref Ex 1 | 2.54 | 2.43 | 8.1 | 8.2 |
| Working Example 16 | $T_m(TM_2)_n$ of Ref Ex 2 | 2.58 | 2.42 | 71.9 | 33.3 |
| Working Example 17 | Blend * | 2.51 | 2.42 | Not tested | 15.5 |

* The blend contained 9 weight parts of $Q(TM_2)_4$ of Ref Ex 3 and 1 weight part of $T(TM_2)_3$ of Ref Ex 1.

The three days 425° C. aged samples were analyzed for composition by GC-MS and LC-MS. The studies on aged $T(TM_2)_3$ of Working Example 15 by GC-MS and LC-MS showed that $T(TM_2)_3$ was identified as the major component in the aged sample, along with small amount of small molecules, such as hexamethyldisiloxane (MM) and $M_3T$. The LC-MS studies on the aged sample of Working Example 16 showed no significant low molecular weight degraded species, further indicating this sample had good thermal stability and would be useful as a HTF in the CSP industry. The GC-MS and LC-MS studies on the aged Blend of Working Example 17 showed that $Q(TM_2)_4$ was observed as the major component, further indicating this sample had good thermal stability and would be useful as a HTF in the CSP industry.

In this Example 7, low molecular weight volatile species were analyzed by GC-FID in the samples prepared and aged as described above in examples 5 and 6. The results are shown below in Tables 5, 6, and 7. The $T(TM_2)_3$ prepared in Reference Example 1 had the least amount of volatile species.

TABLE 5

Volatile Species in $T(TM_2)_3$ of Reference Example 1 after Aging

| Aging Conditions/Species (amount in weight parts) | 400° C., 24 hrs | 400° C., 3 days | 425° C., 3 days |
|---|---|---|---|
| Hexamethyldisiloxane (MM) | 5.4 | 3.3 | 6 |
| Octamethyltrisiloxane (MDM) | 0.1 | Not detected | Not detected |

TABLE 5-continued

Volatile Species in T(TM$_2$)$_3$ of Reference Example 1 after Aging

| Aging Conditions/Species (amount in weight parts) | 400° C., 24 hrs | 400° C., 3 days | 425° C., 3 days |
|---|---|---|---|
| Tris(trimethylsiloxy)methylsilane (M$_3$T) | 7.6 | 1.5 | 1.7 |
| Tetra(trimethylsiloxy)silane (M$_4$Q) | 0.1 | Not detected | Not detected |

TABLE 6

Volatile Species in T$_m$(TM$_2$)$_n$ of Reference Example 2 after Aging

| Aging Conditions/Species (amount in weight parts) | 400° C., 24 hrs | 400° C., 3 days | 425° C., 3 days |
|---|---|---|---|
| Hexamethyldisiloxane (MM) | 2.7 | 7.7 | 7.6 |
| Octamethyltrisiloxane (MDM) | Not detected | 0.07 | 0.04 |
| Tris(trimethylsiloxy)methylsilane (M$_3$T) | 3 | 3.9 | 5.4 |
| Tetra(trimethylsiloxy)silane (M$_4$Q) | Not detected | Not detected | 0.04 |

TABLE 7

Volatile Species in Blend of 90% Q(TM$_2$)$_4$ and 10% T(TM$_2$)$_3$ after Aging

| Aging Conditions/Species (amount in weight parts) | 400° C., 24 hrs | 400° C., 3 days | 425° C., 3 days |
|---|---|---|---|
| Hexamethyldisiloxane (MM) | Not tested | 3.6 | 5.1 |
| Octamethyltrisiloxane (MDM) | Not tested | Not detected | 0.02 |
| Tris(trimethylsiloxy)methylsilane (M$_3$T) | Not tested | 5.1 | 10.6 |
| Tetra(trimethylsiloxy)silane (M$_4$Q) | Not tested | 0.1 | 0.6 |

Problem to be Solved

There is a need in the CSP industry for HTFs with one or more of the following properties: thermal stability at >400° C., a freeze point at or below RT, relatively low vapor pressure, and good heat transfer properties.

INDUSTRIAL APPLICABILITY

The above examples show that the branched polysiloxane compounds described herein can be useful as heat transfer fluids at temperatures of 400° C. and higher. Without wishing to be bound by theory, it is thought that the branched polysiloxane compounds described herein may have properties superior to properties of SYLTHERM™ 800 Heat Transfer Fluid.

Definitions and Usage of Terms

All amounts, ratios, and percentages herein are by weight, unless otherwise indicated. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 8.

TABLE 8

Abbreviations

| Abbreviation | Definition |
|---|---|
| ° C. | degrees Celsius |
| cm | centimeter |
| CSP | concentrated solar power |
| D3 | hexamethylcyclotrisiloxane |
| D4 | octamethylcyclotetrasiloxane |
| D5 | decamethylcyclopentasiloxane |
| D6 | dodecamethylcyclohexasiloxane |
| Da | Daltons (or q/mol) |
| FID | Flame ionization detection |
| GC | Gas chromatoqraphy |
| q/mol | grams per mole |
| h | hours |
| HTF | heat transfer fluid |
| Hz | Hertz |
| LC | Liquid chromatoqraphy |
| m | meter |
| Me | methyl |
| min | minutes |
| mL | milliliters |
| mm | millimeter |
| mPa · s | milliPascal seconds |
| M$_4$Q | tetra(trimethylsiloxy)silane |
| MS | Mass spectrometry |
| M$_3$T | tris(trimethylsiloxy)methylsilane |
| NMR | nuclear maqnetic resonance |
| PDMS | polydimethylsiloxane |
| ppm | parts per million |
| RT | room temperature of 25° C. ± 5° C. |

TABLE 8-continued

| Abbreviations | |
|---|---|
| Abbreviation | Definition |
| μL | microliter |
| μm | micrometer |
| V | volt |

Test methods used herein are described below.

Viscosity—viscosity was reported in mPa·s and was measured using a Brookfield DV-III Ultra rheometer with cone spindle CPA-40Z at 25° C.

GC-FID and GC/MS PREPARATION AND EXPERIMENTAL: The sample was analyzed diluted in acetone with a known quantity of internal standard (octane) added using liquid injection gas chromatography mass spectrometry (GC/MS) in EI mode with simultaneous GC-flame ionization detection (FID) using the parameters described. Quantitative results are based on weight percent adjusted to the internal standard. Peak identifications for GC-FID were made by comparison to the simultaneous GC/MS data on the same samples. Theoretical response factors were used to determine individual component response relative to the internal standard. Quantitative amounts provided should be considered estimates. This approach does adjust for non-volatiles or non-elutable components from the GC column. Not all components were identified and reported. Annotated GC/MS total ion chromatograms are included for the sample analyzed. The other samples were historical results on this material at various conditions for comparison. GC-FID results were provided. The sample was collected on an instrument with dual detection GC/MS and GC-FID. MS14 INSTRUMENT CONDITIONS: Liquid Injection Analysis Instrument Conditions (MS14): Helium carrier gas
- Agilent 7890 column program: 40° C. (1 min)-310° C. (8 min) @ 10° C./min
- Column: HP5-MS UI capillary column, 29 m×0.25 mm×0.25 μm
  - constant flow=1.2 mL/min
  - Velocity=28 cm/sec
- Inlet: split, 270° C.
  - 50:1 split ratio
  - 1μ injection
  - Acetone syringe rinse solvent
- Detector: Agilent 5977A MSD
  - 280° C.
  - MS scan range 15-1050 m/z
  - Threshold 150
  - 1.5 scans/second
  - EI (electron ionization)
- Detector: Agilent 7890 FID
  - 300° C.
  - 400 mL/min Air
  - 25 mL/min He makeup
  - 30 mL/min hydrogen
  - 20 Hz
  - Range=0

GC/MS may not detect highly polar compounds, non-volatile compounds, or high molecular weight (>500 g/mol) compounds. GC/MS is unable to differentiate between isomers with the same empirical formula and mass without representative standards. In general, branched materials will elute before a linear material of the same empirical formula. The mass calibration was verified to be accurate on the day of analysis.

GC/MS data are qualitative only. Although this is a qualitative technique, typically analytes present between 5-100 ppm can be observed using this technique. This estimation is dependent on the analyte's structure and properties and detector response for that day. Estimates of the number of components present cannot be determined using GC/MS alone. Relative amounts of components can usually be determined using a GC technique. GC-FID accuracy and precision parameters have not been determined for this sample type or by the approach used for analysis. Repeatability is estimated to be ±10% (relative) but will likely be dependent on the concentration of individual components.

ESI MS Experimental

Sample Preparation

The sample was analyzed by electrospray ionization LC-MS to structurally identify the species present in the 450° C. heat aged $T(TM_2)_3$ sample. The samples were individually diluted in Fisher HPLC grade THF at a concentration of 100 ppm (vol/vol). The diluted samples were then analyzed by flow injection analysis using positive-ion electrospray ionization (+ESI).

UPLC-MS-MS Instrumentation
- Instrument: Agilent 1200 UPLC System
- Solvent A: 18 MegaOhm Water with 1 g/L $NH_4OAc$
- Solvent B: Fisher HPLC Grade THF
- Flow Rate: 0.40 mL/min
- Injection Volume: 0.1 uL
- Binary LC Gradient:
  - Time 0.0=70% B
  - Time 20.0=95% B
  - Time 20.5=100.0% B MS Conditions:
- Instrument: Agilent 6520 Quadrupole/Time-of-Flight (Q-TOF) Tandem Mass Spectrometer
- Ion Source: Dual electrospray ionization
- Mode: Positive Ion—MS1
- Drying Gas Temp: 300° C.
- Drying Gas Flow Rate: 5 L/min
- Nebulizer Pressure: 60 psi
- Fragmentor Voltage: 175 V
- Skimmer Voltage: 75V
- Octapole1 RF Voltage: 750 V
- Capillary Voltage: 4000V
- Reference Masses: 121.0509, 922.0098
- Acquisition Mode: MS1
- Mass Range: 119-3200 Da
- Scan Rate: 1 spectrum/second Statement of Accuracy and Precision: FIA ESI-MS data is not inherently quantitative. Quantitative FIA ESI-MS results require the use of high purity standards for each analyte of interest.

NMR—$^1$H NMR was recorded on Varian 400 MHz NMR spectrometer with 5 mm glass NMR tube. All samples were taken in $CDCl_3$.

Mn and Mw can be measured by GPC according to the method described in U.S. Pat. No. 9,593,209, Reference Example 1 at col. 31.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "300 to 500" may be further delineated into a lower third, i.e., 300 to 366, a middle third, i.e., 367 to 433, and an upper third, i.e., from 434 to 500, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

The invention claimed is:

1. A method comprising operating a system at a temperature of 25° C. to 500° C. using a heat transfer fluid comprising a branched polysiloxane compound comprising a moiety of formula: $(TM_2)_x$, where T represents a unit of formula $(RSiO_{3/2})$ and M represents a unit of formula $(R_3SiO_{1/2})$, each R is an independently selected monovalent hydrocarbon group of 1 to 6 carbon atoms, and subscript $x \geq 3$, and wherein the branched polysiloxane compound comprises a species selected from the group consisting of:

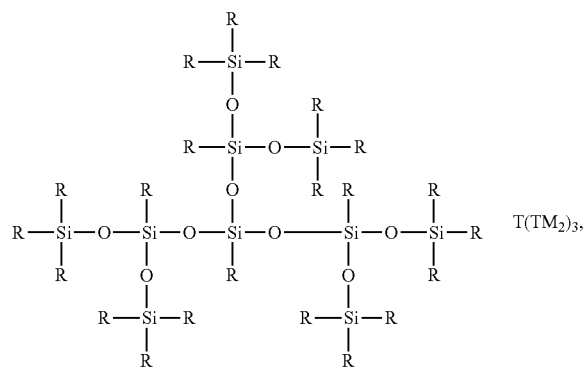

$T(TM_2)_3$,

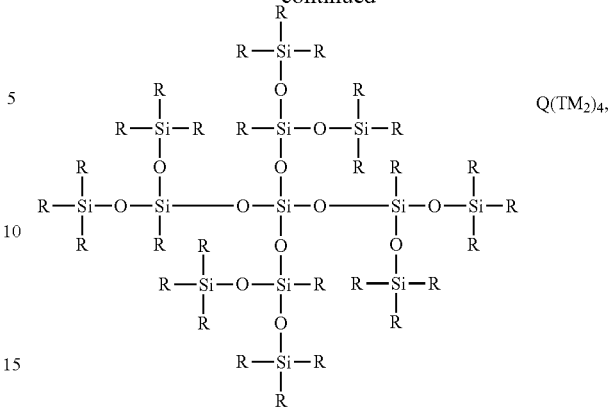

$Q(TM_2)_4$, $T_m(TM_2)_n$, where subscript m>1, subscript n>3, and n/m is 1 to 1.5, and a combination of two or more of $T(TM_2)_3$, $Q(TM_2)_4$, and $T_m(TM_2)_n$, where operating the system comprises heating the heat transfer fluid at a temperature of 300° C. to 500° C.

2. The method of claim 1, where the system is selected from the group consisting of a parabolic trough system, a linear Fresnel reflector system, a power tower system, a dish engine system, and two or more thereof.

3. The method of claim 1, where each R is selected from the group consisting of alkyl, alkenyl, and aryl.

4. The method of claim 3, where each R is selected from the group consisting of methyl, vinyl, and phenyl.

5. The method of claim 4, where each R is methyl.

6. The method of claim 1, where the branched polysiloxane compound comprises a species selected from the group consisting of:

$T(TM_2)_3$, $T_m(TM_2)_n$, and a combination of $T(TM_2)_3$ and $T_m(TM_2)_n$.

7. The method of claim 6, where each R is selected from the group consisting of alkyl, alkenyl, and aryl.

8. The method of claim 7, where each R is selected from the group consisting of methyl, vinyl, and phenyl.

9. The method of claim 8, where each R is methyl.

* * * * *